United States Patent
Kumazawa et al.

(10) Patent No.: US 10,116,244 B2
(45) Date of Patent: Oct. 30, 2018

(54) MOTOR DRIVING CIRCUIT AND METHOD PROVIDING SMOOTH RECOVERY FROM TRANSIENT POWER LOSS

(71) Applicant: SEMICONDUCTOR COMPONENTS INDUSTRIES, LLC, Phoenix, AZ (US)

(72) Inventors: Fumio Kumazawa, Ota (JP); Takashi Ogawa, Ogaki (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/453,633

(22) Filed: Mar. 8, 2017

(65) Prior Publication Data

US 2017/0366121 A1 Dec. 21, 2017

Related U.S. Application Data

(60) Provisional application No. 62/351,679, filed on Jun. 17, 2016.

(51) Int. Cl.
| | |
|---|---|
| *G05B 5/00* | (2006.01) |
| *G05D 3/00* | (2006.01) |
| *H02H 7/08* | (2006.01) |
| *H02P 1/04* | (2006.01) |
| *H02P 6/20* | (2016.01) |
| *H02P 6/14* | (2016.01) |

(52) U.S. Cl.
CPC . *H02P 6/20* (2013.01); *H02P 6/14* (2013.01)

(58) Field of Classification Search
CPC .................................... H02P 6/20; H02P 6/14
USPC ........................................................ 318/466
See application file for complete search history.

(56) References Cited

U.S. PATENT DOCUMENTS

| | | | |
|---|---|---|---|
| 6,611,117 B1* | 8/2003 | Hardt | H02P 6/12 318/400.1 |
| 2003/0006725 A1* | 1/2003 | Otsuka | H02P 29/02 318/268 |
| 2013/0043817 A1 | 2/2013 | Shibuya et al. | |
| 2013/0093373 A1* | 4/2013 | Chen | H02H 7/0838 318/400.21 |
| 2013/0106435 A1* | 5/2013 | Mori | E05F 15/41 324/612 |
| 2014/0055063 A1 | 2/2014 | Peterson et al. | |
| 2015/0042251 A1 | 2/2015 | Suzuki | |
| 2015/0162860 A1 | 6/2015 | Bian | |
| 2015/0180391 A1 | 6/2015 | Ogawa | |

FOREIGN PATENT DOCUMENTS

| | | |
|---|---|---|
| JP | 2008-252965 | 10/2008 |
| JP | 2010-045941 | 2/2010 |
| JP | 2013-081369 | 5/2013 |
| JP | 2015-053752 | 3/2015 |

* cited by examiner

*Primary Examiner* — Erick Glass
(74) *Attorney, Agent, or Firm* — Ramey & Schwaller, LLP

(57) ABSTRACT

According to at least some embodiments, a method for driving a motor includes, upon a restart of the motor, determining whether the rotor is rotating based on a signal generated from outputs of at most one Hall sensor. The method further includes, if it is determined that the rotor is rotating, determining a plurality of output duty values for driving a plurality of windings of the motor. The method further includes generating a drive signal for driving the motor based on the determined plurality of output duty values.

15 Claims, 9 Drawing Sheets

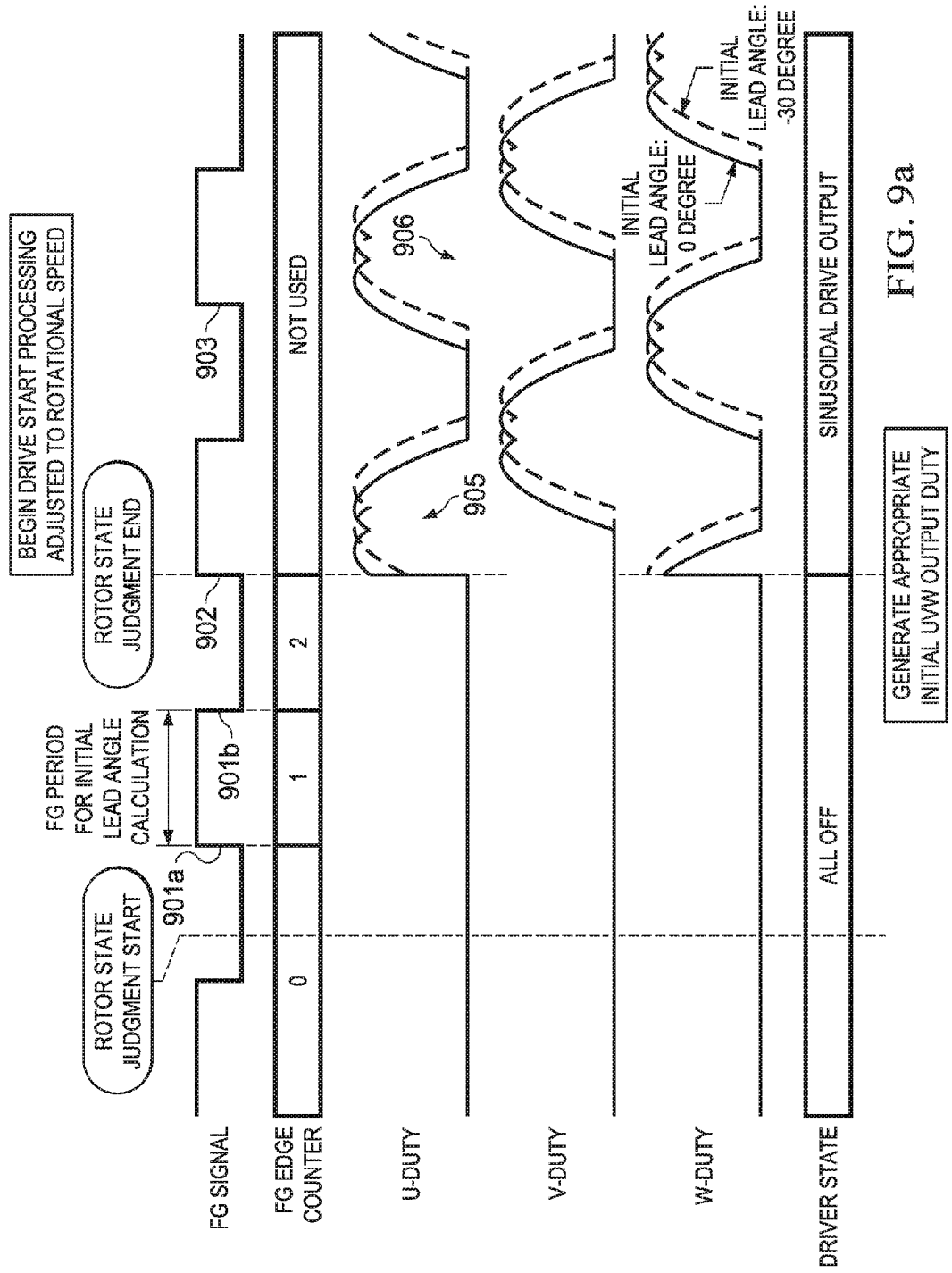

MOTOR DRIVING CIRCUIT AND METHOD PROVIDING SMOOTH RECOVERY FROM TRANSIENT POWER LOSS

CROSS-REFERENCE TO RELATED APPLICATION(S)

This application claims the benefit of U.S. Provisional Application No. 62/351,679, filed Jun. 17, 2016, the contents of which are incorporated by reference herein in their entirety.

BACKGROUND

Multi-phase motors are used in a variety of applications including disc drives, digital video disc players, scanners, printers, plotters, actuators used in automotive and aviation industries, etc. Generally, multi-phase motors include a stationary portion or stator that produces a rotating magnetic field and a non-stationary portion or rotor in which torque is created by the rotating magnetic field. The torque causes the rotor to rotate which in turn causes a shaft connected to the rotor to rotate. The motors are driven by motor drive circuits.

Motor drive circuits are designed to meet desired motor performance parameters which may include noise level specifications, start-up specifications, maximum rotational speed specifications, etc. Noise specifications may be set to provide continuity of current flow during motor startup, or during motor rotation, or during motor stoppage. Start-up or motive power specifications may be set so that the motor reliably starts. Rotational speed specifications may be set to ensure there is sufficient torque drive to cover a large number of different motors. For example, the desired rotational speed of a server is higher than that of a personal computer. It is commonly believed that three-phase motors are better at achieving the desired specifications compared to single phase motors; however, three-phase motors cost more than single phase motors. In addition, three-phase motors provide current having sinusoidal characteristics from motor start-up to motor stoppage or cessation and they allow accurate determination of motor position and rotation speed. Three-phase motors typically include three Hall sensors, which is one of the reasons these motors are more expensive to manufacture. A Hall sensor may be referred to as a Hall element.

BRIEF DESCRIPTION OF THE DRAWINGS

Embodiments of the present invention will be better understood from a reading of the following detailed description, taken in conjunction with the accompanying drawing figures, in which:

FIGS. 9a and 9b illustrate examples of generation of values of the U-duty, V-duty and W-duty while sinusoidal drive signals are generated.

For simplicity and clarity of illustration, elements in the figures are not necessarily to scale, and the same reference characters in different figures denote the same elements. Additionally, descriptions and details of well-known steps and elements are omitted for simplicity of the description.

DETAILED DESCRIPTION

Figure 1:
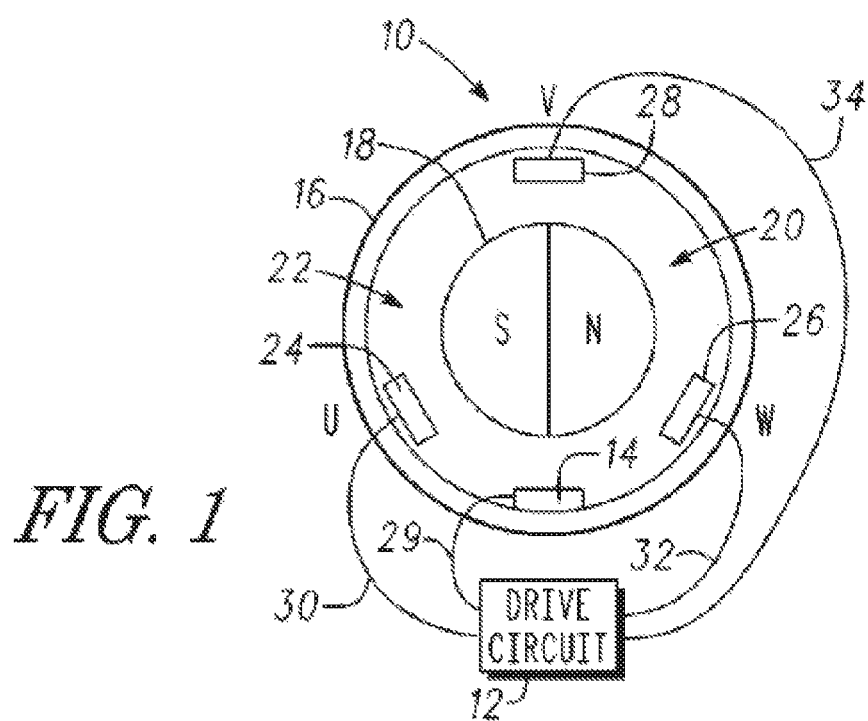
FIG. 1 is a diagrammatic representation of a three-phase motor in accordance with at least some embodiments.

As noted earlier, a reason why three-phase motors are more expensive to manufacture is that these types of motors typically include three Hall sensors. According to various embodiments disclosed herein, three-phase motors include fewer than two Hall sensors (e.g., only 1 Hall sensor). Such motors are less expensive to manufacture.

According to one or more embodiments, a method for driving a motor including a rotor includes, upon a restart of the motor, determining whether the rotor is rotating based on a signal generated from outputs of at most one Hall sensor. The method further includes, if it is determined that the rotor is rotating, determining a plurality of output duty values for driving a plurality of windings of the motor. The method further includes generating a drive signal for driving the motor based on the determined plurality of output duty values.

The restart of the motor may be caused by a glitch in a power supply voltage.

The drive signal may include a signal having a sinusoidal configuration.

The signal generated from the outputs of the Hall sensor may include a frequency generator (FG) signal, and determining whether the rotor is rotating may include determining whether detection of an edge of the FG signal occurs within a particular duration of time. Determining whether the rotor is rotating may further include counting a number of edges of the FG signal that are detected, and comparing the number of edges against a particular threshold. Determining whether the rotor is rotating may further include determining a lead angle upon detection of an edge of the FG signal within the particular duration of time. The lead angle may be determined based on a rotational speed of the rotor.

The method may further include bypassing the determination of whether the rotor is rotating if the determination is disabled.

The method may further include, if it is determined that the rotor is not rotating, generating a drive signal for driving the motor.

The method may further include, if it is determined that the rotor is rotating, beginning drive start processing, as adjusted based on a rotational speed of the rotor.

According to one or more embodiments, a system for driving a motor including a rotor includes a drive circuit. Upon a restart of the motor, the drive circuit determines whether the rotor is rotating based on a signal generated from outputs of at most one Hall sensor. If it is determined that the rotor is rotating, the drive circuit determines a plurality of output duty values for driving a plurality of windings of the motor. The drive circuit generates a drive signal for driving the motor based on the determined plurality of output duty values.

The restart of the motor may be caused by a glitch in a power supply voltage.

The drive signal may include a signal having a sinusoidal configuration.

The signal generated from the outputs of the Hall sensor may include an FG signal, and the drive circuit may determine whether the rotor is rotating by determining whether detection of an edge of the FG signal occurs within a particular duration of time. The drive circuit may determine whether the rotor is rotating by: counting a number of edges of the FG signal that are detected, and comparing the number of edges against a particular threshold. The drive circuit may determine a lead angle upon detection of an edge of the FG signal within the particular duration of time. The lead angle may be determined based on a rotational speed of the rotor.

The drive circuit may bypass the determination of whether the rotor is rotating if the determination is disabled.

If it is determined that the rotor is not rotating, the drive circuit may generate a drive signal for driving the motor.

If it is determined that the rotor is rotating, the drive circuit may begin drive start processing, as adjusted based on a rotational speed of the rotor.

FIG. 1 is a diagrammatic representation of a three-phase motor 10 in accordance with at least some embodiments. The three-phase motor 10 is driven by a drive circuit 12 in response to one or more signals from a Hall sensor 14. Drive circuit 12 may be referred to as a driver, and Hall sensor 14 may be referred to as a Hall element. Three-phase motor 10 includes a stator 16 and a rotor 18 having a portion 20 magnetized with a first pole and a portion 22 magnetized with a second pole. By way of example, portion 20 is a north pole, and portion 22 is a south pole.

A coil 24 is coupled to or mounted on a portion of stator 16, a coil 26 is coupled to or mounted on another portion of stator 16, and a coil 28 is coupled to or mounted on yet another portion of stator 16. Coil 24 may be referred to as a U-phase winding, coil 26 may be referred to as a W-phase winding, and coil 28 may be referred to as a V-phase winding. Drive circuit 12 is coupled to Hall sensor 14 via an electrical interconnect 29, is coupled to coil 24 via an electrical interconnect 30, is coupled to coil 26 via an electrical interconnect 32, and is coupled to coil 28 through an electrical interconnect 34. Electrical interconnects 29, 30, 32, and/or 34 may be wires, electrically conductive traces, or the like.

Figure 2:
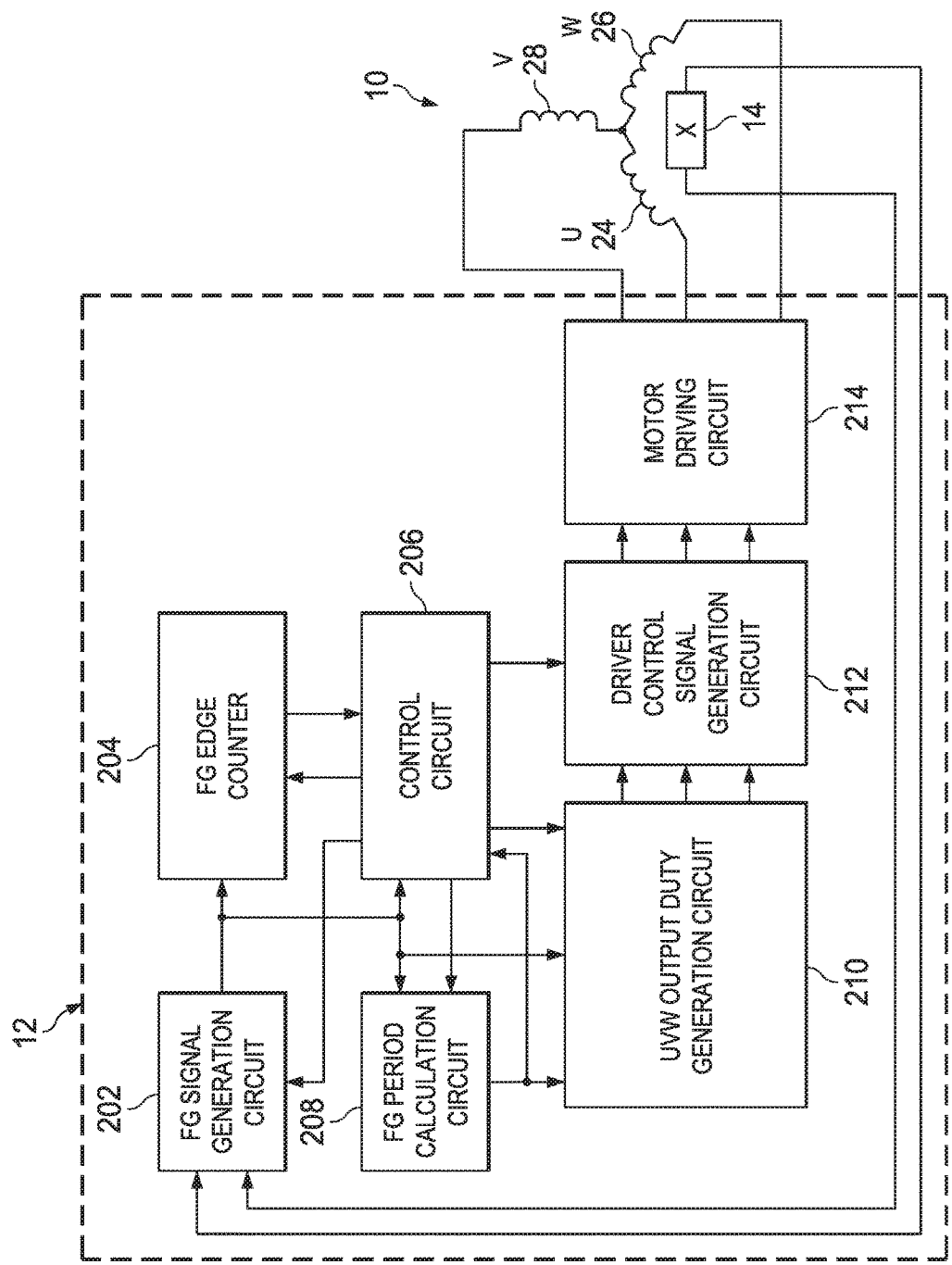
FIG. 2 is a block diagram of a drive circuit according to at least some embodiments.

FIG. 2 includes a block diagram of the drive circuit 12 of FIG. 1 according to at least some embodiments. FIG. 2 also includes diagrammatic representations of three-phase motor 10 and Hall sensor 14. With reference to FIG. 2, the drive circuit 12 includes a frequency generator (FG) signal generation circuit 202, an FG edge counter 204, a control circuit 206, an FG period calculation circuit 208, a UVW output duty generation circuit 210, a drive control signal generation circuit 212 and a motor driving circuit 214. The motor driving circuit 214 is coupled to U-phase winding 24, W-phase winding 26 and V-phase winding 28. As such, the motor driving circuit 214 may provide motor driving signals for driving the windings 24, 26 and 28.

Figure 3:
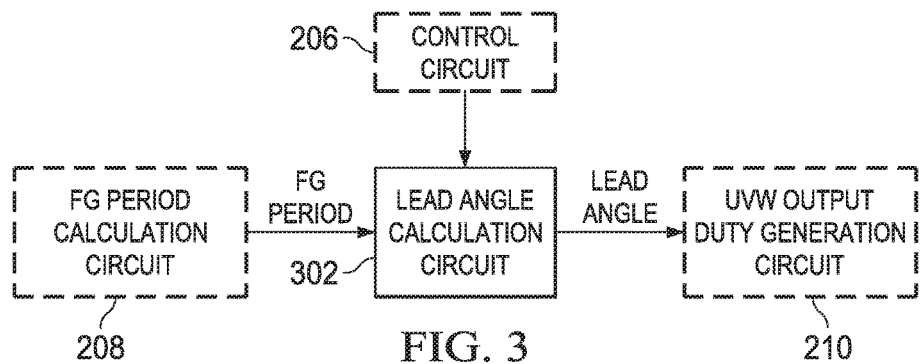
FIG. 3 is a partial block diagram of the drive circuit according to at least some embodiments.

FIG. 3 is a partial block diagram of the drive circuit 12 according to at least some embodiments. With reference to FIG. 3, the drive circuit 12 further includes a lead angle calculation circuit 302. The control circuit 206 and the FG period calculation circuit 208 are coupled to inputs of the lead angle calculation circuit 302. An output of the lead angle calculation circuit 302 is coupled to an input of the UVW output duty generation circuit 210.

As will be described in more detail later with reference to at least some embodiments, a lead angle is calculated based on a current rotational speed of a rotor (e.g., rotor 18) if it is determined that the rotor is rotating. In this regard, in response to a signal provided by the control circuit 206, the lead angle calculation circuit 302 determines a lead angle based on an FG period (a period of an FG signal) that is determined by the FG period calculation circuit 208. The lead angle calculation circuit 302 provides the determined lead angle to the UVW output duty generation circuit 210.

As noted earlier, according to various embodiments, three-phase motors that include fewer than two Hall sensors (e.g., only one Hall sensor) are employed. In addition (or alternatively), the motor is driven such that a smoother drive and a more quiet level of operation is achieved, e.g., particularly when the motor restarts due to a glitch in a power source.

In various applications, a power source voltage (e.g., a battery voltage) may temporarily drop. In applications such as automotive applications, such events may be more likely to occur as compared to other types of applications (e.g., consumer electronics). If the magnitude of the drop is sufficiently large, operation of a drive circuit (e.g., drive circuit 12) may temporarily cease. However, even if operation of the drive circuit ceases, the motor (e.g., rotor 18) may still rotate (e.g., due to inertia).

As noted earlier with reference to various embodiments, a three-phase motor that includes fewer than two Hall sensors is employed. According to such embodiments, the motor (e.g., three-phase motor 10) is driven based on an output from only one Hall sensor 14. The motor is driven by a drive signal having a sinusoidal configuration (180-degree conduction). Alternatively, the motor is driven by a drive signal having a square wave configuration.

When the motor restarts (e.g., after occurrence of a transient drop in a battery voltage), it is determined whether the motor is rotating. The determination is based on a signal (e.g., an FG signal) generated from outputs of a single Hall sensor. The status of phases (e.g., phases of driving signals for U-phase, V-phase and W-phase windings) are then set. Then, rotation of the motor is restarted. Accordingly, a smooth drive and quiet operation of the motor may be achieved, when a glitch in a power supply and a subsequent recovery occur. To increase the quiet level of the operation—when the motor is restarted, the motor is driven at a level that approximates the level at which the motor was driven prior to the power supply glitch.

As will be described in more detail later with respect to particular embodiments, a sine wave drive including lead angle control is provided during time of recovery. This may be provided if lead angle control based on a rotational speed is performed. In addition to the rotational speed of the rotor, position information of the rotor may also be extracted (or collected).

Figure 4:
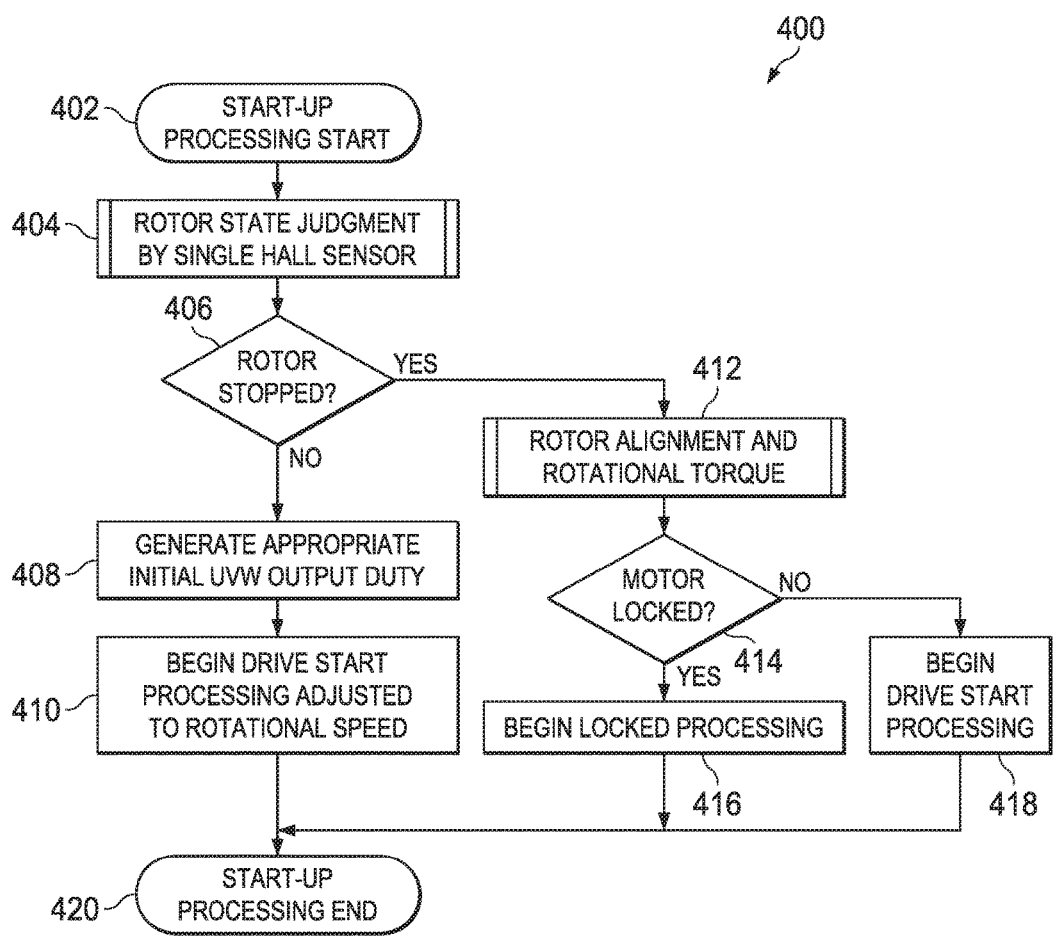
FIG. 4 is a flow diagram of a method of driving a motor in accordance with at least some embodiments.

FIG. 4 is a flow diagram of a method 400 of driving a motor in accordance with at least some embodiments. With reference to FIG. 4, at box 402, start-up processing begins. The start-up processing is performed, e.g., after a transient drop in a battery voltage causes a drive circuit (e.g., drive circuit 12) to cease operation, and the drive circuit resumes operation again.

At box 404, a state of a rotor (e.g., rotor 18) is determined. For example, at box 406, it is determined whether the rotor is stopped. As will be explained in more detail later with reference to particular embodiments (e.g., embodiments relating to FIGS. 5 and 6), the determination is made based on a signal generated from outputs of a single Hall sensor.

If it is determined that the rotor is rotating (the rotor is not stopped), then, at box 408, an appropriate UVW output duty is determined. At box 410, drive start processing is begun, as adjusted based on a rotational speed of the rotor. At box 420, the start-up processing ends. Accordingly, the motor is ready to start operating.

If it is determined that the rotor is not rotating (the rotor is stopped), then, at box 412, driving for aligning the rotor is performed, and, then, driving for providing a rotational torque to the motor is performed. For example, rotor alignment is performed and a rotational torque is provided.

At box 414, it is determined whether the motor is in a locked condition or a stuck condition. If it is determined that the motor is in either of these two conditions, then, at box 416, the drive circuit 12 implements or begins a locked processing procedure. At box 420, the start-up processing ends.

If it is determined that the motor is neither in a locked condition nor in a stuck condition, then, at box 418, the drive circuit 12 implements or begins a drive start processing procedure. The drive start processing procedure may include generating a sine wave drive signal. At box 420, the start-up processing ends. Accordingly, the motor is ready to start operating.

Figure 5:
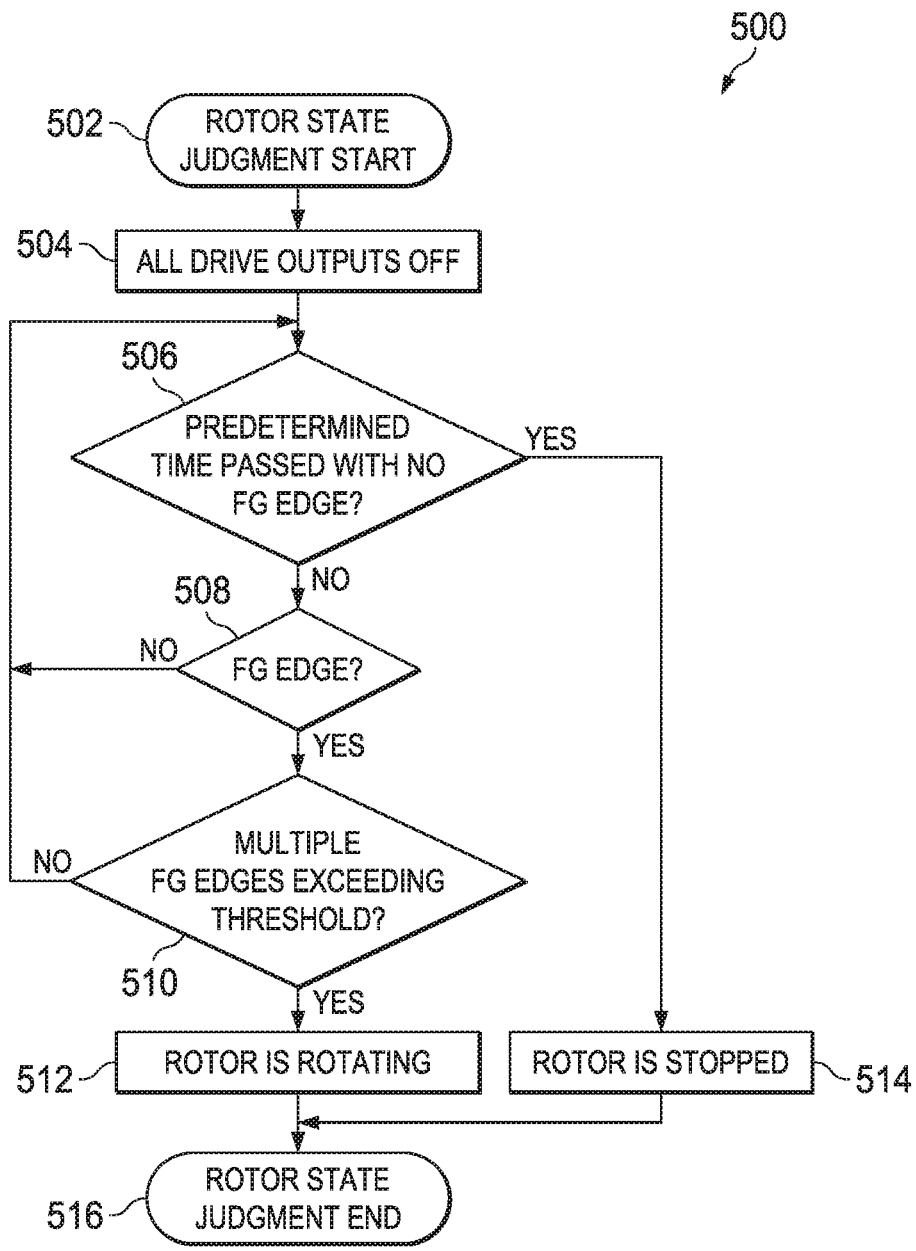
FIG. 5 is a flow diagram of a method of determining whether a rotor of a motor is rotating according to at least some embodiments.

FIG. 5 is a flow diagram of a method 500 of determining whether a rotor of a motor is rotating (see, e.g., box 404) according to at least some embodiments. At box 502, the method of determining begins.

At box 504, all drive outputs are turned off. Then, operations for detecting FG edges begin. The FG edge is a rising or falling edge of a signal generated from outputs of a Hall sensor (e.g., Hall sensor 14). At box 506, it is determined whether a predetermined amount of time has passed (or elapsed) without detection of an FG edge. If the predetermined amount of time has passed, then, at box 514, it is determined that the rotor is stopped.

If the predetermined amount of time has not yet passed, then the operations for detecting any FG edge(s) continue. Once an FG edge is detected (see box 508), a counter that counts the number of FG edges that are detected is incremented. At box 510, the counter is compared against a particular threshold. If the number of detected FG edges exceeds the particular threshold, then, at box 512, it is determined that the rotor is rotating. Otherwise, if the number does not exceed the threshold, then it is again determined whether a predetermined amount of time has passed without detection of an FG edge (see box 506). At box 516, the method of determining whether the rotor is rotating ends.

In at least some embodiments, the method 500 does not include calculation or determination of an initial lead angle for the motor system. For example, calculation of the initial lead angle is not performed because the motor system employs a fixed lead angle. Accordingly, the value of the lead angle is already provided.

The lead angle is for changing (e.g., reducing) a phase delay (or phase lag) that may exist between application of a voltage (for driving a motor such as motor 10) and the application of a current at a coil (such as coil 24, 26, 28). The voltage is applied in order to feed current to the coil. However, when the voltage is applied, the current is not fed to the coil instantaneously. Rather, there typically is a phase delay between the application of the voltage and the application of the current. Typically, the faster the motor rotates, the larger the phase delay.

To reduce the phase delay, the voltage is applied earlier, in order to improve the efficiency of the motor rotation. The degree to which the voltage is applied earlier corresponds to the value of the lead angle. The larger the lead angle, the earlier the voltage is applied. Calculation of an initial lead angle will be described in more detail with respect to other embodiments (see, e.g., FIG. 6).

Figure 6:
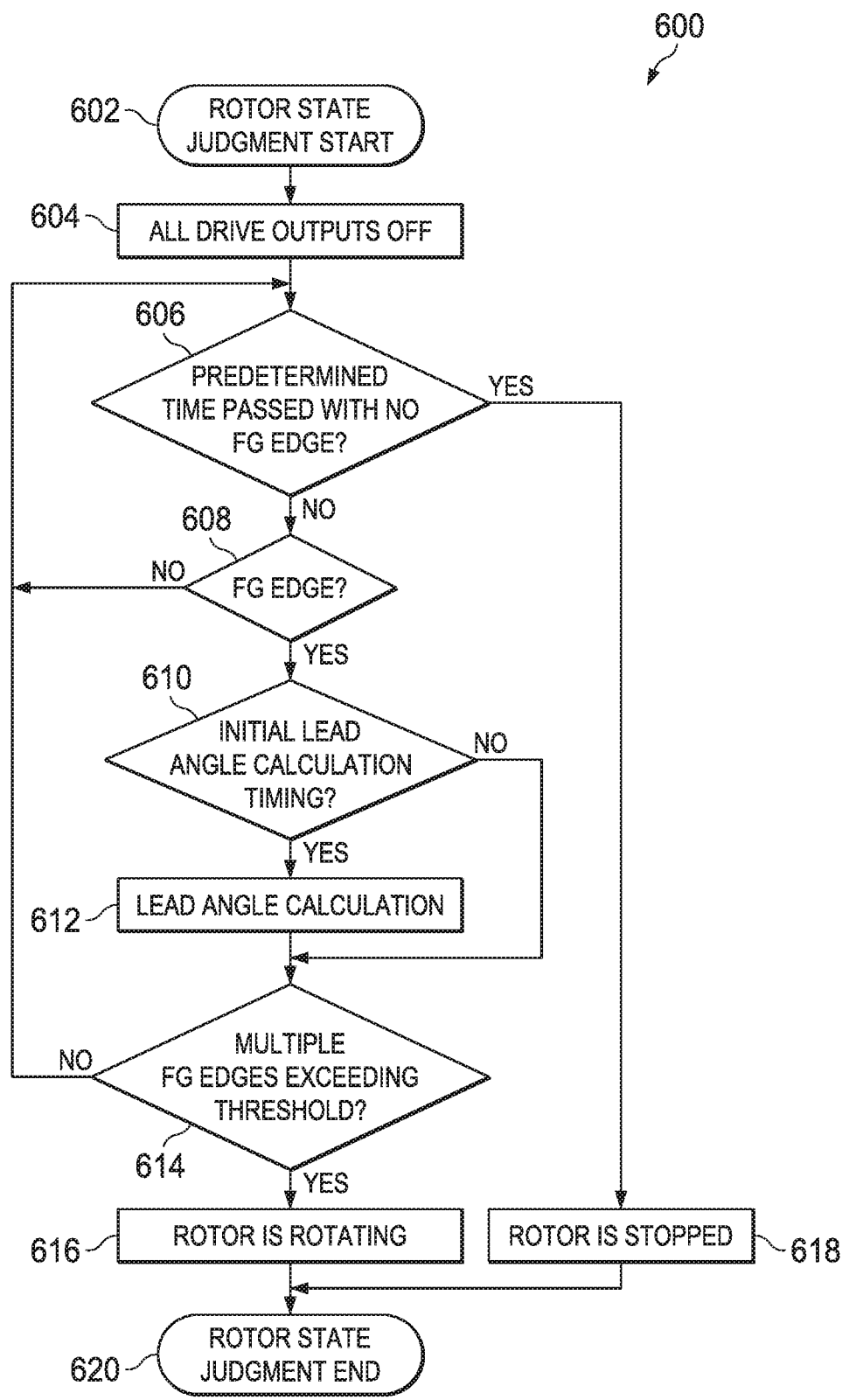
FIG. 6 is a flow diagram of a method of determining whether a rotor of a motor is rotating according to at least some embodiments.

FIG. 6 is a flow diagram of a method 600 of determining whether a rotor of a motor is rotating (see, e.g., box 404) according to at least some embodiments. At box 602, the method of determining begins.

At box 604, all drive outputs are turned off. Then, operations for detecting FG edges begin. The FG edge is a rising or falling edge of a signal generated from outputs of a Hall sensor (e.g., Hall sensor 14). At box 606, it is determined whether a predetermined amount of time has passed (or elapsed) without detection of an FG edge. If the predetermined amount of time has passed, then, at box 618, it is determined that the rotor is stopped.

If the predetermined amount of time has not yet passed, then, the operations for detecting any FG edge(s) continue. Once an FG edge is detected (see box 608), a counter that counts the number of FG edges that are detected is incremented. Also, at box 610, it is determined whether initial lead angle calculation is to be performed. If the calculation is to be performed, then, at box 612, the initial lead angle is calculated.

In at least one embodiment, determining whether the calculation is to be performed is based on the value of the counter described in the above paragraph. For example, the value of the counter is compared against a particular value. If the value of the counter equals the particular value, then the initial lead angle is calculated. Otherwise, the initial lead angle is not calculated.

By way of example, the particular value is set equal to 2. Accordingly, the initial lead angle is not calculated upon detection of a first FG edge. Rather, the initial lead angle is calculated upon detection of the next FG edge (second FG edge). Upon detection of the third and other subsequent FG edges, the initial lead angle is not calculated.

In at least one embodiment, the calculation of the initial lead angle is performed based on a lookup table. For purposes of illustration, it is assumed that the particular value is set equal to 2. A timer (or counter) is initialized and activated when the first FG edge is detected (e.g., at box 608). The timer is stopped when the second FG edge is detected. The value of the timer is compared against values of a lookup table that contains timer values and corresponding lead angle values. In at least one embodiment, the lookup table covers all possible ranges of timer values. Based on the comparison, an appropriate value of a lead angle is selected. Typically, the faster the motor rotates, the larger the initial lead angle.

After the lead angle is calculated (or if it is determined that initial lead angle calculation is not to be performed), the counter is compared against a particular threshold (see box 614). If the number of detected FG edges exceeds the particular threshold, then, at box 616, it is determined that the rotor is rotating. Otherwise, if the number does not exceed the threshold, then it is again determined whether a predetermined amount of time has passed without detection of an FG edge (see box 606). At box 620, the method of determining whether the rotor is rotating ends.

Figure 7:
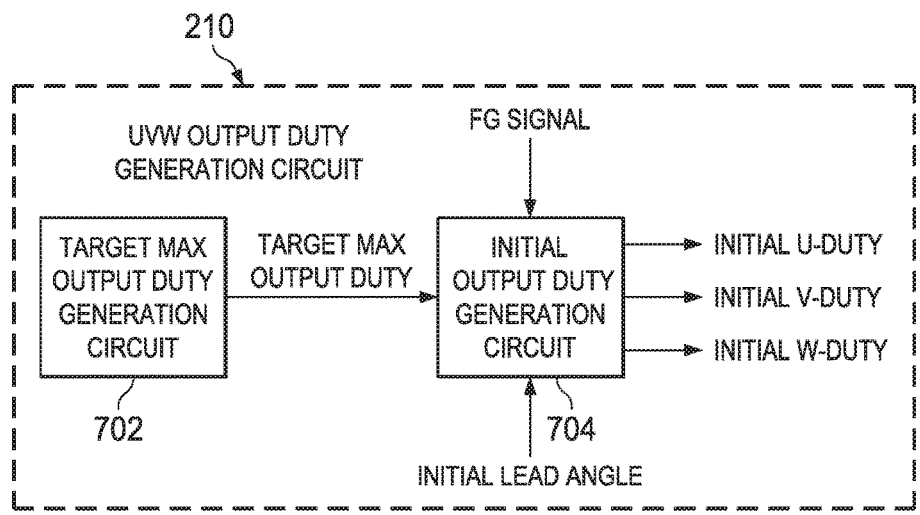
FIG. 7 is a block diagram of a UVW output duty generation circuit according to at least some embodiments.

FIG. 7 is a block diagram of a UVW output duty generation circuit (see 210 of FIG. 2). The UVW output duty generation circuit performs generation of initial UVW output duty values (see, e.g., box 408 of FIG. 4), and includes a target max output duty generation circuit 702 and an initial output duty generation circuit 704. The target max output duty generation circuit 702 provides a target max output duty to the initial output duty generation circuit 704. The initial output duty generation circuit 704 further receives an FG signal generated from outputs of a single Hall sensor (e.g., Hall sensor 14). The initial output duty generation circuit 704 may also receive a value of an initial lead angle (see, e.g., box 612 of FIG. 6). Accordingly, the initial output duty generation circuit 704 produces values of an initial U-duty, an initial V-duty, and an initial W-duty for driving U-phase, V-phase and W-phase windings, respectively.

Figure 8A:
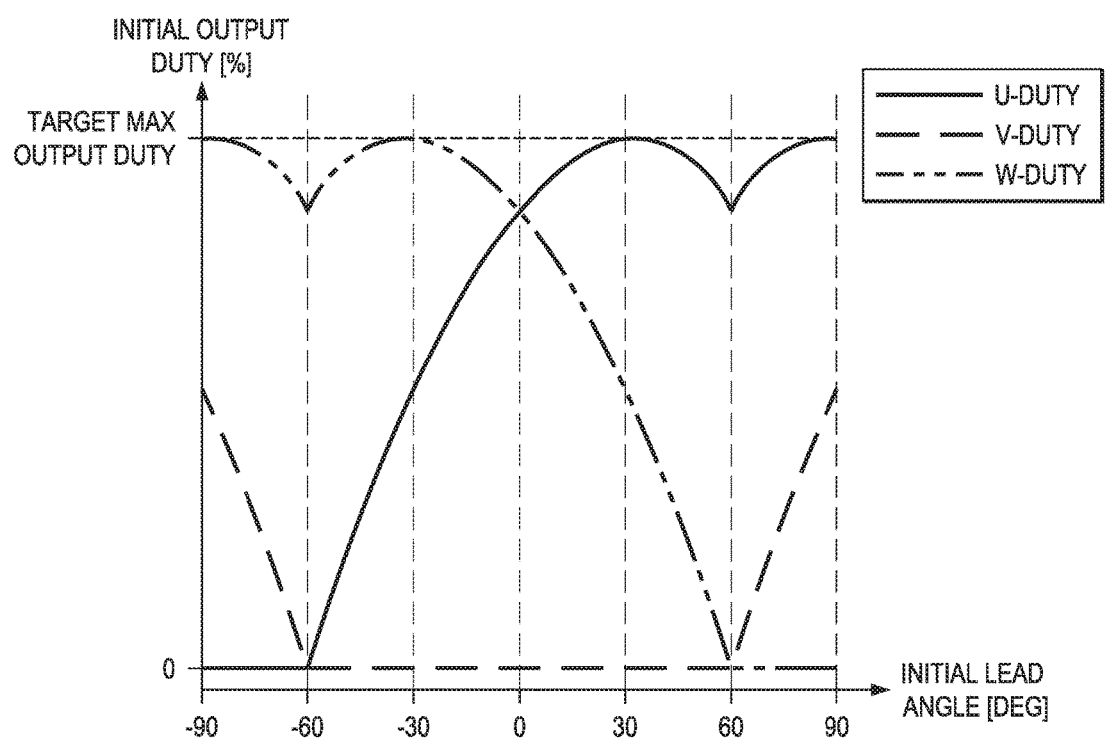
FIGS. 8a and 8b illustrate example values of the initial output duty (U-duty, V-duty and W-duty) based on values of the initial lead angle.

FIG. 8a illustrates example values of the initial output duty (U-duty, V-duty and W-duty) based on a value of the initial lead angle. For example, the initial lead angle may have been determined at box 612 of FIG. 6. The example values of FIG. 8a correspond to generation of motor drive signals based on a positive edge (rising edge) of the FG signal (see, e.g., positive edge 902 of FIG. 9a).

The target max output duty may be a preset value that is based on the motor system. The target max output duty may be determined based on pulse-width modulation (PWM) input, and/or any other techniques that are known in the art. For purposes of simplicity, FIG. 8a will be described based on an assumption that the target max output duty is equal to 100%. However, it is understood that the target max output duty may be less than 100%. If the initial lead angle is equal to 0 degrees, then the values of the initial U-duty, the initial V-duty, and the initial W-duty are equal to approximately 84%, 0%, and 84%, respectively. Accordingly, if the initial lead angle is equal to 0 degrees, then the sine wave drive signals for the U-duty, the V-duty, and the W-duty will begin at 84%, 0%, and 84%, respectively (see, e.g., FIG. 9a).

Another example will now be described also with reference to FIG. 8a. Again, for purposes of simplicity, it is assumed that the target max output duty is equal to 100%. If the initial lead angle is equal to −30 degrees, then the values of the initial U-duty, the initial V-duty, and the initial W-duty are equal to approximately 50%, 0%, and 100%, respectively. Accordingly, if the initial lead angle is equal to −30 degrees, then the sine wave drive signals for the U-duty, the V-duty, and the W-duty will begin at 50%, 0%, and 100%, respectively (see, e.g., FIG. 9a).

FIG. 9a illustrates examples of generation of values of the U-duty, V-duty and W-duty while sinusoidal drive signals are generated. In the example illustrated in FIG. 9a, the sinusoidal drive signals are generated beginning at (e.g., coincident with) the 3rd FG edge that occurs after rotor state judgment begins (see, e.g., box 602 of FIG. 6). Accordingly, the sinusoidal drive signals are output beginning at edge 902.

As illustrated in FIG. 9a, the edge 902 is a positive edge signal. It is understood that the sinusoidal drive signals may be generated beginning at an FG edge different from the edge 902. For example, the sinusoidal drive signals may be generated beginning at the 5th FG edge (edge 903) that occurs after the rotor state judgment begins. As another example, the sinusoidal drive signals may be generated beginning at a specific type of edge (e.g., positive edge). For example, the sinusoidal drive signals may be generated beginning at the $3^{rd}$ positive FG edge (edge 903) that is detected after the rotor state judgment begins. In such an example, only positive FG edges are counted for the purpose of timing the generation of sinusoidal drive signals.

When the FG signal changes, the sinusoidal signals change accordingly. In more detail—for a particular period (or cycle), the sinusoidal signal changes based on the period of the FG signal that immediately precedes the particular period of the sinusoidal signal. For example—with reference to FIG. 9a, period 905 of the U-duty signal changes based on the period of the FG signal that begins at the edge 901a. Similarly, period 906 of the U-duty signal changes based on the period of the FG signal that begins at the edge 902.

For purposes of simplicity, the FG signal is illustrated as a square wave. That is, the amplitude of the FG signal alternates at a steady frequency between high and low values. However, it is understood that the FG signal may more closely resemble a pulse wave that does not have the symmetrical shape associated with a perfect square wave. If the FG signal more closely resembles a pulse wave, the description in the above paragraph remains applicable.

In the example of FIG. 9a, when sinusoidal signals are output, two signals are active at the same time while a third signal is not active. For example, at the time of edge 902, the U-duty and W-duty signals are active at the same time while the V-duty signal is not active. However, in other examples, it is understood that, all 3 signals may be active at the same time.

Figure 8B:
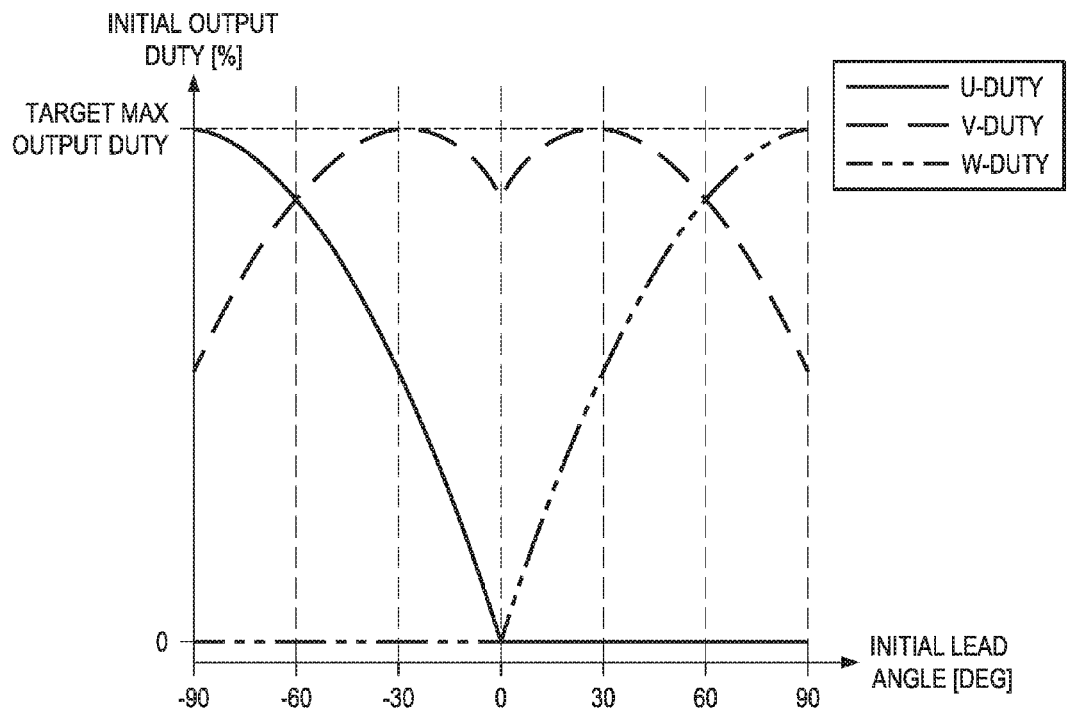

Similar to FIG. 8a, FIG. 8b illustrates example values of the initial output duty (U-duty, V-duty and W-duty) based on values of the initial lead angle. The initial lead angle may have been determined at box 612 of FIG. 6. Unlike the example values of FIG. 8a, the example values of FIG. 8b correspond to generation of motor drive signals based on a negative edge (falling edge) of the FG signal (see, e.g., negative edge 904 of FIG. 9b).

Figure 9B:
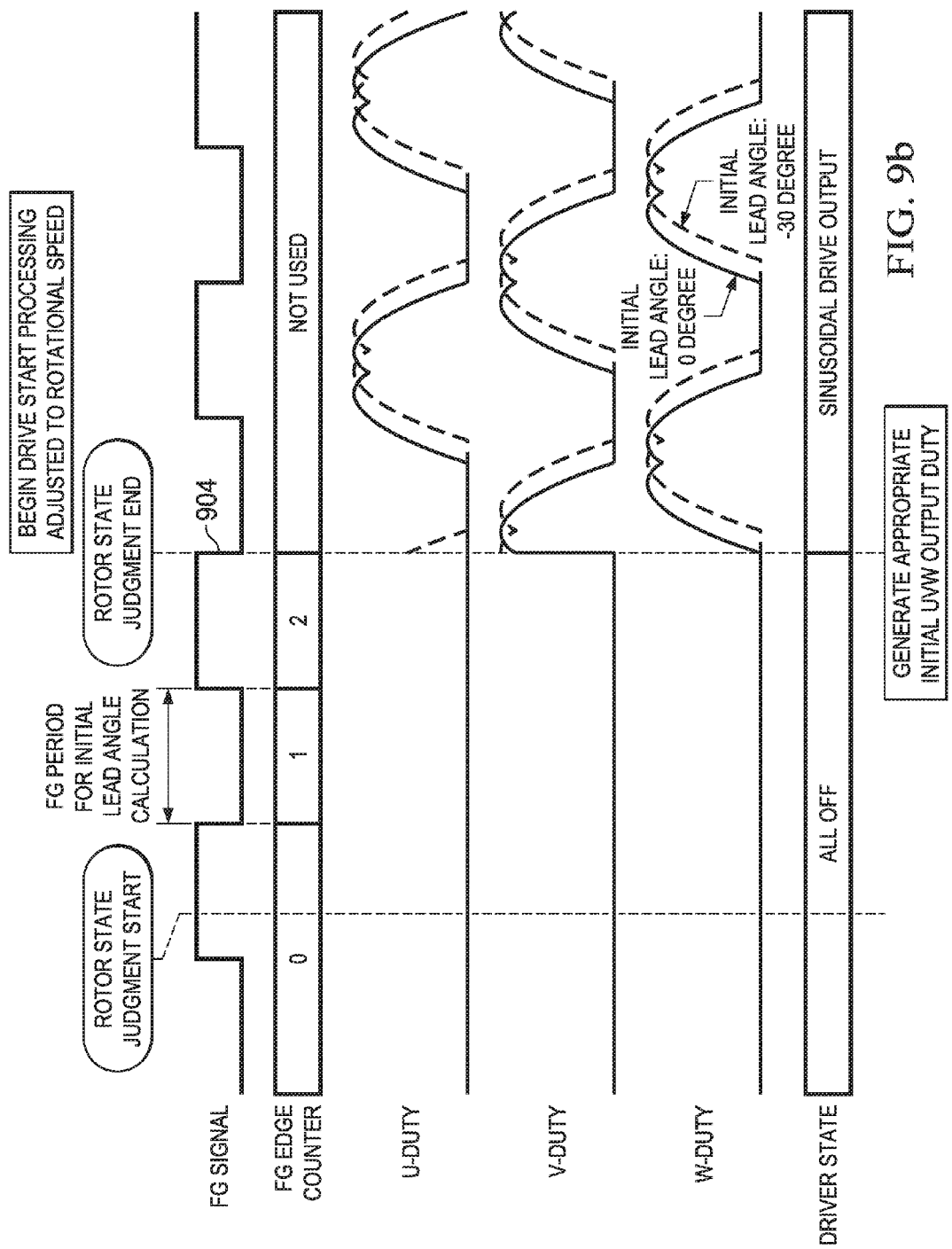

FIG. 9b illustrates examples of generation of values of the U-duty, V-duty and W-duty while sinusoidal drive signals are generated. In the example illustrated in FIG. 9b, the sinusoidal drive signals are generated beginning at (e.g., coincident with) the 3rd FG edge that occurs after rotor state judgment begins (see, e.g., box 602 of FIG. 6). Accordingly, the sinusoidal drive signals are output beginning at edge 904.

The examples of FIGS. 8b and 9b are similar to the earlier-described examples of FIGS. 8a and 9a. Therefore, for purposes of brevity, the examples of FIGS. 8b and 9b will not be described in further detail below.

According to particular embodiments, the determination of whether the rotor is rotating (see, e.g., box 404 of FIG. 4) may be disabled such that corresponding operations (see, e.g., FIGS. 5 and 6) are bypassed. In this regard, whether this determination is performed or made is selectable. This affords an additional degree of flexibility, e.g., for handling applications in which inertia rotation of reverse rotation occurs frequently, and the rotor necessarily stops upon start-up. In such situations, the determination of whether the rotor is rotating may be disabled.

The disabling that is noted above may be implemented using suitable circuit structure(s) that provide an enable/disable capability. When the determination of whether the rotor is rotating is disabled, then alignment operations (see, e.g., box 412 of FIG. 4) are performed.

Figure 10:
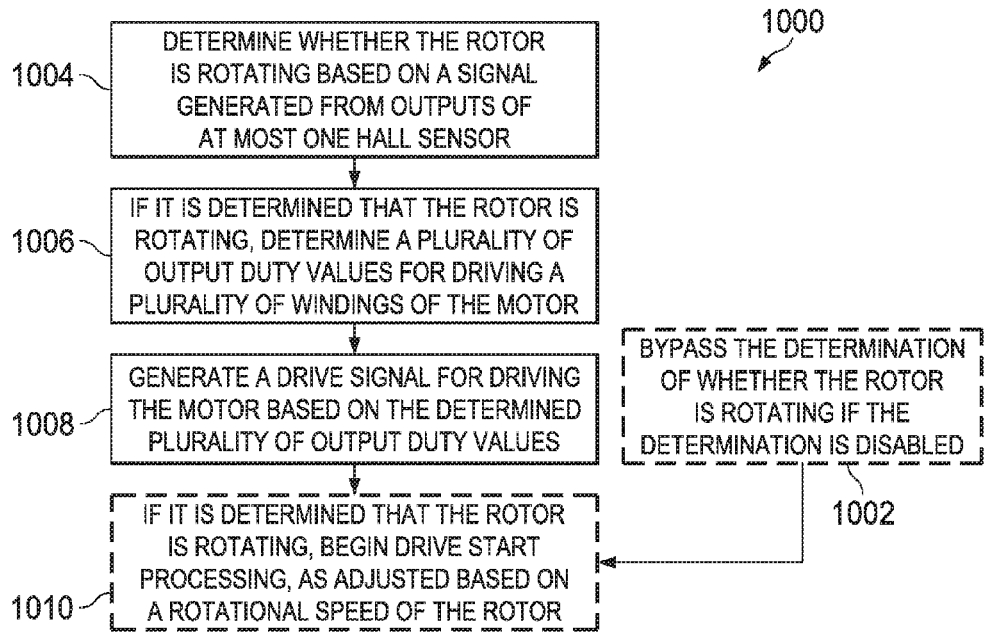
FIG. 10 is a flowchart of a method for driving a motor including a rotor.

FIG. 10 is a flowchart of a method 1000 for driving a motor (e.g., motor 10) including a rotor (e.g., rotor 18). At box 1004, upon a restart of the motor, it is determined whether the rotor is rotating based on a signal generated from outputs of at most one Hall sensor (e.g., Hall sensor 14). The restart of the motor may be caused by a glitch in a power supply voltage.

At box 1006, if it is determined that the rotor is rotating, a plurality of output duty values (e.g., U-duty, V-duty and W-duty) for driving a plurality of windings (U-phase winding 24, W-phase winding 26, and V-phase winding 28) are determined.

At box 1008, a drive signal is generated for driving the motor based on the determined plurality of output duty values. The drive signal may include a signal having a sinusoidal configuration.

At box 1002, the determination of whether the rotor is rotating may be bypassed if the determination is disabled.

At box 1010, if it is determined that the rotor is rotating, drive start processing is begun, as adjusted based on a rotational speed of the rotor. Alternatively (or in addition), if it is determined that the rotor is not rotating, a drive signal is generated for driving the motor.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for driving a motor including a rotor driven by stator coils, the stator coils receiving drive signals controlled by a drive circuit, the method comprising recovering from a power supply glitch or transient by:
    deriving a signal from at most one Hall sensor that senses a magnetic field polarity of the rotor;
    detecting whether the signal lacks a transition within a predetermined time period, and if so, determining that the rotor is not rotating;
    detecting whether the signal includes multiple transitions separated by no more than the predetermined time period, and if so, determining that the rotor is rotating; and
    if it is determined that the rotor is rotating:
        determining duty cycle values for each of the stator coils based on timing of the multiple transitions; and
        driving the motor by supplying the drive signals to the stator coils using said duty cycle values.

2. The method of claim 1, wherein the drive circuit varies the duty cycle values sinusoidally.

3. The method of claim 1, wherein determining whether the rotor is rotating further comprises:
    counting a number of signal transitions that are detected; and
    comparing the number of signal transitions against a particular threshold.

4. The method of claim 1, wherein if it is determined that the rotor is rotating, the drive circuit further determines a lead angle based on the timing of the multiple transitions.

5. The method of claim 4, wherein the lead angle is determined based on a rotational speed of the rotor derived from the timing of the multiple transitions.

6. The method of claim 1, further comprising: bypassing said detecting of signal transitions within a predetermined time period if the determination of whether the rotor is rotating is disabled.

7. The method of claim 1, further comprising: if it is determined that the rotor is not rotating, supplying drive signals to the stator coils in accordance with a start-up procedure.

8. The method of claim 1, wherein said duty cycle values are determined for implementing a start-up procedure as adjusted based on a rotational speed of the rotor.

9. A drive circuit for driving stator coils of a motor including a rotor, the drive circuit comprising:
    a frequency signal generation circuit that derives a signal from at most one Hall sensor that senses a magnetic field polarity of the rotor;
    a period calculation unit that detects upon restart whether the signal lacks a transition within a predetermined time period;
    an edge counter that detects upon restart whether the signal includes multiple transitions separated by no more than the predetermined time period;
    a control circuit coupled to the period calculation unit and the edge counter to determine whether the rotor is rotating; and
    a duty cycle generation circuit that, if it is determined that the rotor is rotating, determines duty cycle values for each of the stator coils based on timing of the multiple transitions; and
    a motor driving circuit that supplies drive signals to the stator coils in accordance with the duty cycle values.

10. The drive circuit of claim 9, wherein the duty cycle generation circuit varies the duty cycle values sinusoidally.

11. The drive circuit of claim 9, wherein the edge counter counts a number of signal transitions that are detected; and wherein the control circuit compares the number of signal transitions against a particular threshold.

12. The drive circuit of claim 9, further comprising a lead angle calculation circuit that determines a lead angle based on the timing of the multiple detections.

13. The drive circuit of claim 12, wherein the lead angle is determined based on a rotational speed of the rotor.

14. The drive circuit of claim 9, wherein, if it is determined that the rotor is not rotating, the duty cycle generation circuit determines the duty cycle values in accordance with a start-up procedure.

15. The drive circuit of claim 9, wherein the duty cycle generation circuit determines the duty cycle values are determined for implementing a start-up procedure, as adjusted based on a rotational speed of the rotor.

* * * * *